(No Model.)

H. W. HILL.
REMOVABLE BUSHING FOR PULLEYS.

No. 374,833. Patented Dec. 13, 1887.

WITNESSES
N. S. Armstutz
Geo. W. King

Harry W. Hill INVENTOR
By
Leggett & Leggett Attorneys

N. PETERS, Photo-Lithographer, Washington, D. C.

UNITED STATES PATENT OFFICE.

HARRY W. HILL, OF CLEVELAND, OHIO.

REMOVABLE BUSHING FOR PULLEYS.

SPECIFICATION forming part of Letters Patent No. 374,833, dated December 13, 1887.

Application filed April 19, 1887. Serial No. 235,389. (No model.)

*To all whom it may concern:*

Be it known that I, HARRY W. HILL, of Cleveland, in the county of Cuyahoga and State of Ohio, have invented certain new and useful Improvements in Removable Bushings for Pulleys, &c.; and I do hereby declare the following to be a full, clear, and exact description of the invention, such as will enable others skilled in the art to which it pertains to make and use the same.

My invention relates to improvements in removable bushings for loose pulleys and other analogous uses in which the bore of the pulley-hub and the inner and outer faces of the bushing are made cylindrical. The bushing is split diagonally and made into two equal parts, to the end that such bushing is cheaply made and that the two members of the bushing being wedge-shaped are easily entered into the bore of the pulley-hub, and when in position hold each other firmly in place without other fastening.

My present invention is designed as an improvement on a device for which United States Letters Patent were granted to me March 16, 1886, No. 337,953.

Figure 1:
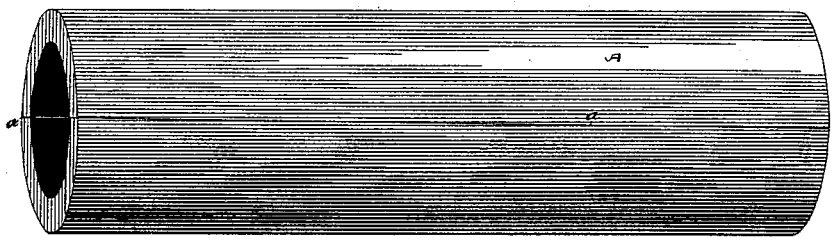
Figure 2:
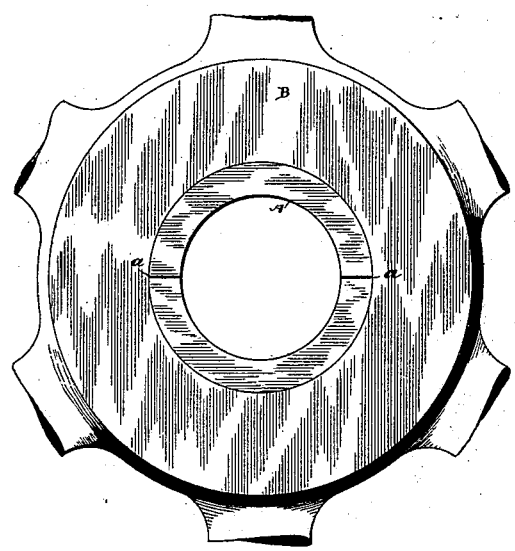

In the accompanying drawings, Figure 1 is a view in perspective of my improved bushing. Fig. 2 is an end view showing the bushing in position in the hub of the pulley.

A represents the bushing, and B the pulley-hub. The bore of the latter is made cylindrical, and the bushing is bored to fit easily on the shaft, is turned off, and made cylindrical externally with a suitable diameter to fit tight in the bore of the pulley-hub. The bushing is then divided lengthwise into two equal parts, the division-line being made in a plane slightly oblique with the axis of the bushing, leaving each part correspondingly wedge-shaped.

In dividing the bushing small thin milling-tools are used, the kerf of which need not exceed a thirty-second of an inch in width.

In placing the bushing in the bore of the hub the two members thereof are entered the small ends foremost and from opposite ends of the hub. Thin strips, *a*, of suitable material, preferably sheet-zinc, are inserted between the edges of the bushing, these liners being substantially of the same thickness as the kerf cut out in dividing the bushing. When the two members of the bushing are driven in flush with the ends of the hub, the bushing will be wedged in and held sufficiently firm without other fastening.

The bushing may be driven out in the reverse order from which it is entered, and a new bushing substituted at any time at a trifling cost.

What I claim is—

A removable bushing for loose pulleys and other analogous uses, the same consisting of a hollow cylinder divided lengthwise obliquely of the axis of the bushing, substantially as set forth.

In testimony whereof I sign this specification, in the presence of two witnesses, this 7th day of March, 1887.

HARRY W. HILL.

Witnesses:
CHAS. H. DORER,
ALBERT E. LYNCH.